(12) United States Patent
Shiraishi (10) Patent No.: US 8,393,794 B1
(45) Date of Patent: Mar. 12, 2013

(54) BICYCLE BOTTOM BRACKET ASSEMBLY

(75) Inventor: Shingo Shiraishi, Yamaguchi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/229,907

(22) Filed: Sep. 12, 2011

(51) Int. Cl.
*B62M 3/00* (2006.01)
*F16C 9/00* (2006.01)

(52) U.S. Cl. ...................................... 384/458; 384/486

(58) Field of Classification Search .................. 384/458, 384/545, 484–486; 74/594.1, 594.2; 280/259–261
See application file for complete search history.

(56) References Cited

U.S. PATENT DOCUMENTS

| | | | | |
|---|---|---|---|---|
| 607,055 | A | * | 7/1898 | Knape et al. ................... 384/458 |
| 3,551,004 | A | * | 12/1970 | Quisenberry .............. 280/281.1 |
| 4,244,630 | A | | 1/1981 | Tischer |
| 5,281,003 | A | * | 1/1994 | Herman ........................ 74/594.1 |
| 6,161,452 | A | * | 12/2000 | Hilber .......................... 74/594.1 |
| 6,983,672 | B2 | * | 1/2006 | Smith ........................... 74/594.1 |
| 7,059,686 | B2 | * | 6/2006 | Kanehisa ........................ 384/545 |
| 7,258,041 | B2 | | 8/2007 | Yamanaka et al. |
| 7,503,700 | B2 | | 3/2009 | Yamanaka et al. |
| 7,562,604 | B2 | * | 7/2009 | Fukui ............................ 74/594.1 |
| 7,650,817 | B2 | | 1/2010 | Shiraishi et al. |
| 8,246,064 | B2 | * | 8/2012 | Kuroiwa et al. .............. 280/261 |
| 2008/0247695 | A1 | * | 10/2008 | Yamanaka ..................... 384/458 |

FOREIGN PATENT DOCUMENTS

| DE | 9414016 U1 | 10/1994 |
|---|---|---|
| EP | 1 845 015 A2 | 10/2007 |

OTHER PUBLICATIONS

European Search Report of corresponding EP Application. No. 12 17 1709.4 dated Dec. 6, 2012.

\* cited by examiner

*Primary Examiner* — Thomas R Hannon
(74) *Attorney, Agent, or Firm* — Global IP Counselors, LLP (57) ABSTRACT

A bicycle bottom bracket assembly is provided with a support member, a bearing unit and a seal member. The support member includes a hanger mounting structure and a bearing mounting structure. The bearing unit includes an outer race, an inner race and at least one roller element disposed between the outer and inner races. The outer race is fixed to the bearing mounting structure of the support member. The seal member has a proximal end fixed to the support member and a distal end slidably contacting the inner race of the bearing unit.

23 Claims, 6 Drawing Sheets

BICYCLE BOTTOM BRACKET ASSEMBLY

BACKGROUND

1. Field of the Invention

This invention generally relates to a bicycle bottom bracket assembly. More specifically, the present invention relates to a bicycle bottom bracket assembly having sealing structure that prevents water from reaching a bearing unit.

2. Background Information

Generally speaking, a conventional bicycle has a pair of wheels mounted to a main frame formed of a plurality of tubes and a front fork pivotally connected to the main frame. The tubes of the main frame typically include a top tube, a down tube, a head tube, a seat tube, a pair of seat stays, a pair of chain stays and a cylindrical or tubular hanger part.

The cylindrical or tubular hanger part of the frame is often called a bicycle bottom bracket hanger because it supports a bottom bracket. Many different types of bottom brackets are currently available on the market. Generally speaking, a conventional bicycle bottom bracket has a pair of bearings mounted into a tubular hanger part of a bicycle frame for rotatably supporting a crank axle. One type of a conventional bottom bracket assembly is disclosed in U.S. Pat. No. 6,983, 672. This conventional bottom bracket assembly is equipped with first and second axle support members that have first and second bearings, respectively. The first and second axle support members are screwed into both end portions of the hanger part separately. The crank axle is rotatably supported on both of the first and second bearings, and right and left cranks are non-rotatably mounted on the both axial end portions of the crank axle. Sometimes the first and second axle support members are press-fitted in to both end portions of the hanger part. In some cases, a dust tube (e.g., a connecting tube) is provided to prevent contamination such as water, muddy water and so on from intruding from the bottom bracket hanger part of the bicycle frame into the bearing units. One example of a conventional crank axle assembly with a dust tube (e.g., a connecting tube) is disclosed in U.S. Pat. No. 7,503,700.

In view of the above, it will be apparent to those skilled in the art from this disclosure that there exists a need for an improved bicycle bottom bracket assembly. This invention addresses this need in the art as well as other needs, which will become apparent to those skilled in the art from this disclosure.

SUMMARY

One aspect presented in the present disclosure is to provide a bicycle bottom bracket assembly with a reliable sealing structure that prevents water from reaching a bearing unit.

Another aspect presented in the present disclosure is to provide a bicycle bottom bracket assembly with a lower rotational torque seal structure that prevents water from reaching a bearing unit.

In view of the state of the known technology, a bicycle bottom bracket assembly comprises a support member, a bearing unit and a seal member. The support member includes a hanger mounting structure and a bearing mounting structure. The bearing unit includes an outer race, an inner race and at least one roller element disposed between the outer and inner races. The outer race is fixed to the bearing mounting structure of the first support member. The seal member has a proximal end fixed to the support member and a distal end slidably contacting the inner race of the bearing unit.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
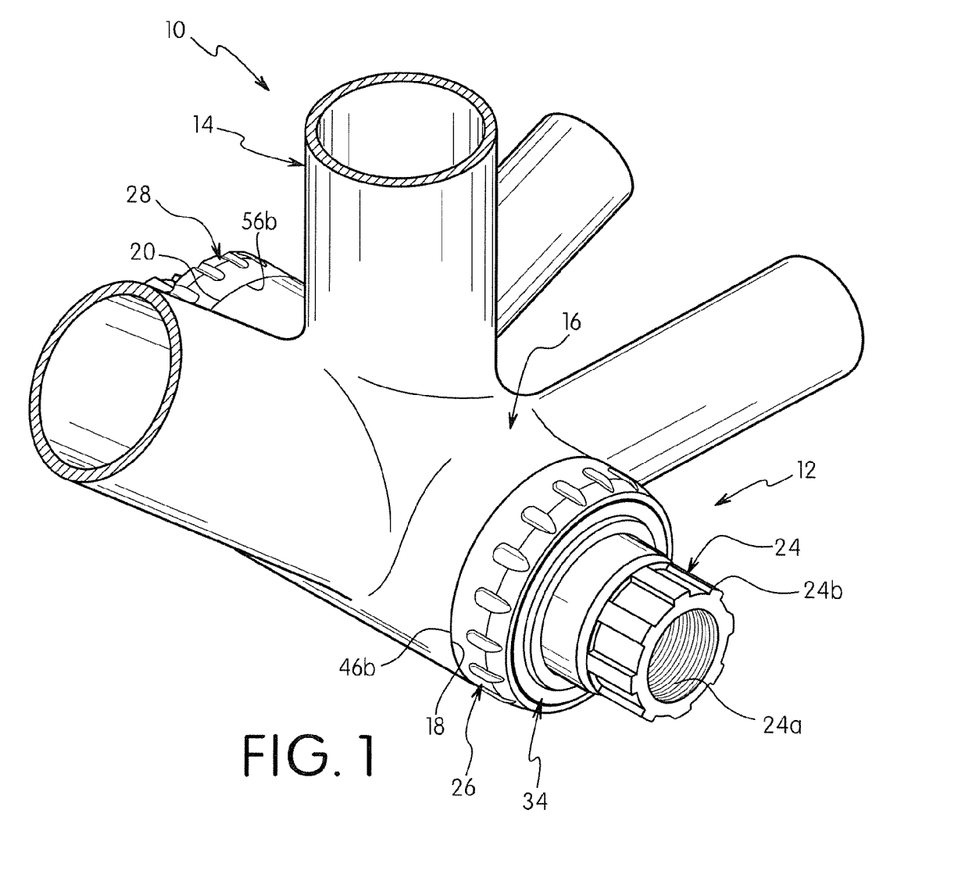
FIG. 1 is an enlarged, partial perspective view of a tubular hanger part of a bicycle frame with a bicycle bottom bracket assembly installed in the tubular hanger part in accordance with one illustrated embodiment.
Figure 2:
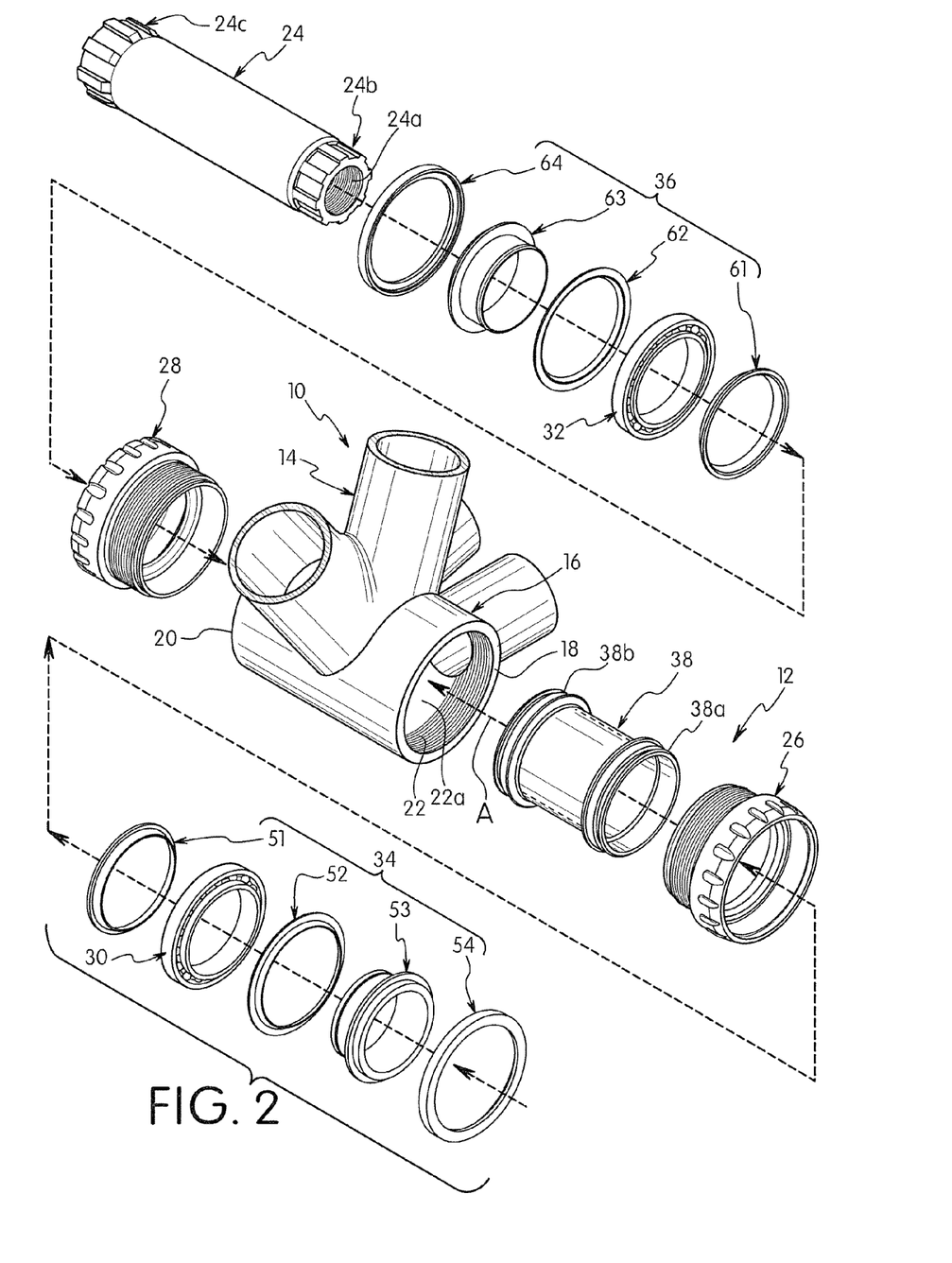
FIG. 2 is an exploded perspective view of the bicycle bottom bracket assembly with the parts of the bottom bracket exploded out of the tubular hanger part of the bicycle frame.
Figure 3:
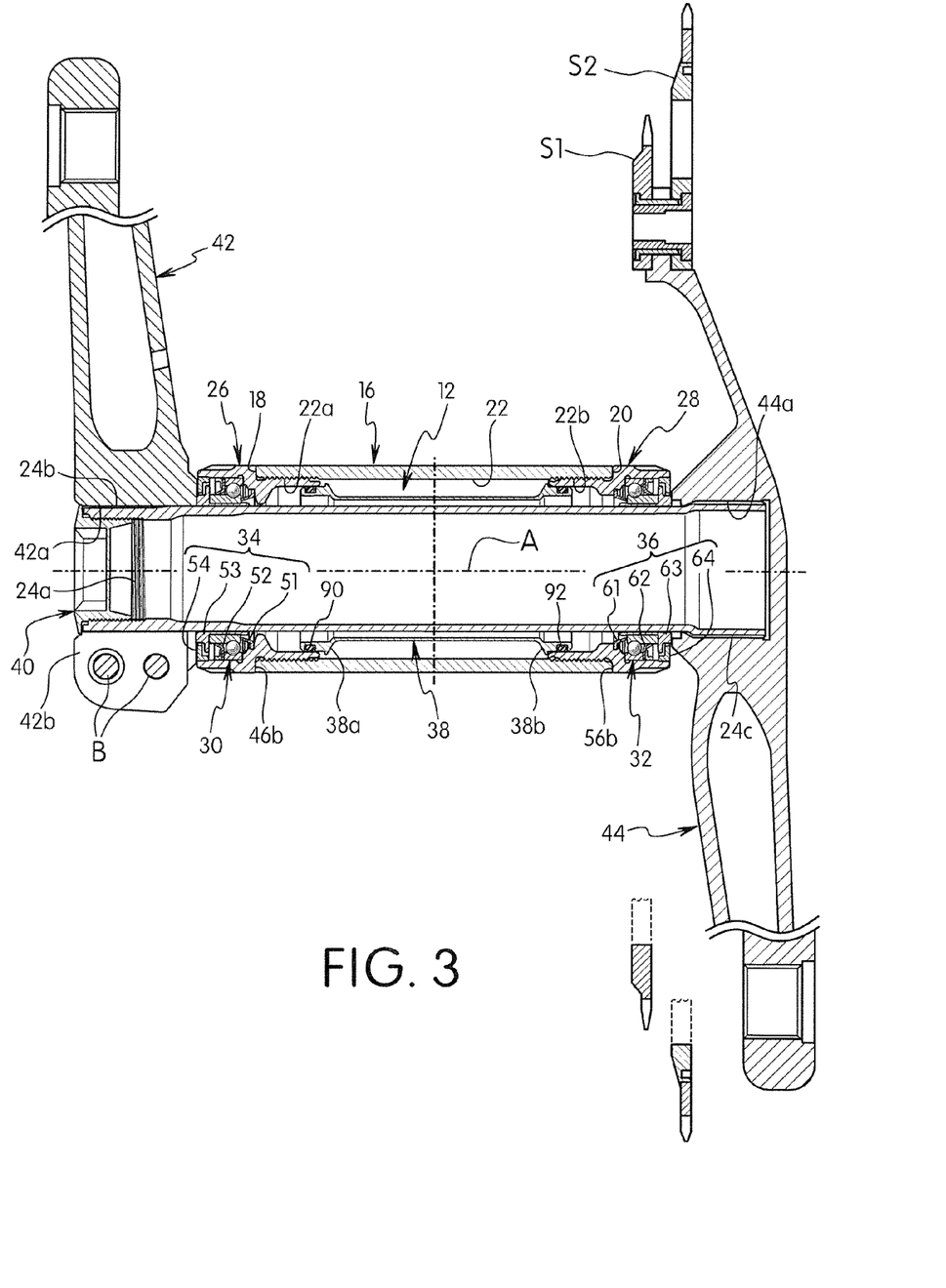
FIG. 3 is a cross sectional view of the bicycle bottom bracket assembly illustrated in FIGS. 1 and 2 with a pair of crank arms mounted to the ends of the crank axle.

Referring initially to FIGS. 1 to 3, a portion of a bicycle 10 is illustrated with a bicycle bottom bracket assembly 12 installed in a bicycle frame 14 of the bicycle 10 in accordance with one illustrated embodiment. The tubular hanger part 16 is made of a hard, rigid material that is typically used in manufacturing bicycle frames. The tubular hanger part 16 has a first open end 18, a second open end 20 and a cylindrical surface 22. The cylindrical surface 22 extends between the first and second open ends 18 and 20 of the tubular hanger part 16. The cylindrical surface 22 has a first threaded portion 22a and a second threaded portion 22b. The first threaded portion 22a is located adjacent the first open end 18, while the second threaded portion 22b is located adjacent the second open end 20.

The bicycle bottom bracket assembly 12 rotatably supports a crank axle 24 within the tubular hanger part 16. In particular, the bicycle bottom bracket assembly 12 includes a first support member 26, a second support member 28, a first bearing unit 30 and a second bearing unit 32 for rotatably supporting the crank axle 24 within the tubular hanger part 16. In the first illustrated embodiment, the bicycle bottom bracket assembly 12 is further provided with a first sealing structure 34 that is associated with the first support member 26 and the first bearing unit 30 for preventing the ingress of water and/or other contaminates from reaching the first bearing unit 30. Likewise, the bicycle bottom bracket assembly 12 is further provided with a second sealing structure 36 that is associated with the second support member 28 and the second bearing unit 32 for preventing the ingress of water and/or other contaminates from reaching the second bearing unit 32. Preferably, the bicycle bottom bracket assembly 12 may further be provided with a connecting tube member 38 extending between the first and second support members 26 and 28.

Basically, in the first illustrated embodiment, left and right ends of the bicycle bottom bracket assembly 12 are mirror images of each other, and have a common rotational center axis A. Specifically, the first and second support members 26 and 28 are identical, the first and second bearing units 30 and 32 are identical, and the first and second sealing structures 34 and 36 are identical. While these parts are illustrated as being identical, it will be apparent to those skilled in the bicycle field that they can be different if needed and/or desired.

Basically, in the first illustrated embodiment, the first and second support members 26 and 28 are threaded into the first and second open ends 18 and 20 of the tubular hanger part 16, respectively. The first and second bearing units 30 and 32 are configured and arranged to rotatably support the crank axle 24 within the tubular hanger part 16 about the rotational center axis A via the first and second support members 26 and 28. The first and second sealing structures 34 and 36 prevent contamination such as water, muddy water and so on from reaching the first and second bearing units 30 and 32.

In the first illustrated embodiment, the first and second bearing units 30 and 32 are press-fitted into the first and second support members 26 and 28, respectively. The terms "press fitted" or "press fit" as used herein refers to fastening two parts together by friction after the parts are longitudinally pushed together, rather than by any other means of fastening. More preferably, the friction of the press-fit connection that holds the two parts together is preferably increased by compression of one part against the other, which relies on the tensile and compressive strengths of the materials that the two parts are made from.

Preferably, the crank axle 24 is removable from the first and second bearing units 30 and 32 in an axial direction of the rotational center axis A without removing the first and second bearing units 30 and 32 from the first and second support members 26 and 28. In the first illustrated embodiment, the crank axle 24 is a hollow pipe-shaped member that is highly rigid. For example, the crank axle 24 is made of a metallic material as chrome molybdenum steel. As shown in FIG. 2, a first or left end portion of the crank axle 24 includes a female or internal thread 24a and a plurality of external splines or serrations 24b.

Figure 4:
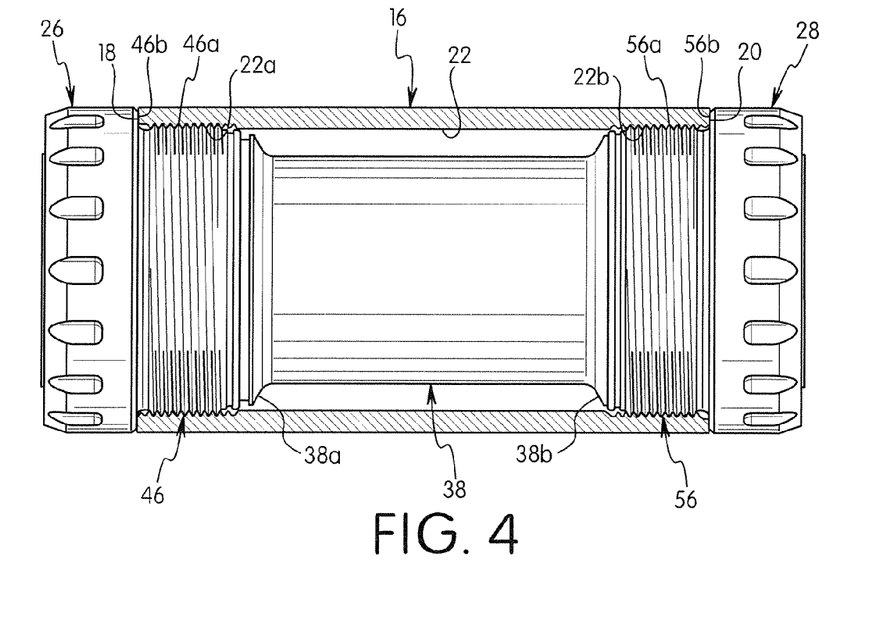
FIG. 4 is an elevational view of the bicycle bottom bracket assembly illustrated in FIGS. 1 to 3.

As shown in FIG. 3, the female (internal threads) thread 24a is disposed on an inner circumferential surface of the left end portion of the crank axle 24 so that a fastening bolt 40 is screwed into the female thread 24a to fasten a left crank arm 42. The serrations 24b are provided on the outer circumferential surface of the left end portion of the crank axle 24 to non-rotatably secure the left crank arm 42 thereon. As shown in FIGS. 3 and 4, a second or right end portion of the crank axle 24 includes a plurality of external splines or serrations 24c to non-rotatably secure a right crank arm 44. The right crank arm 44 is crimped onto the crank axle 24 in a conventional manner. Of course, the crank arms 42 and 44 can be attached to the crank axle 24 in any suitable manner (e.g., threads, crimping, bonding, welding, etc.). In the first illustrated embodiment, the left crank arm 42 is removably fastened to the left end of the crank axle 24, while the right crank arm 44 is preferably fixed to the right end of the crank axle 24 so that the right crank arm 44 is integrally coupled to the crank axle 24 through a splined-connection. Alternatively, the right crank arm 44 may be designed to be removably fastened to the right end of the crank axle 24 as with the left crank arm 42. The pedals are mounted to the tip or free ends of the right and left crank arms 42 and 44.

As seen in FIG. 3, the left crank arm 42 includes a splined connecting hole 42a that is non-rotatably connected on the serrations 24b of the crank axle 24. The left crank arm 42 is fixedly coupled to the crank axle 24 by the fastening bolt 40 that is screwed on the female thread 24a of the crank axle 24. The right crank arm 44 is a gear crank that has two chain rings or sprockets S1 and S2 mounted thereon in a removable manner by a crank connecting part. The right crank arm 44 includes a splined connecting hole 44a that is non-rotatably connected on the serrations 24c of the crank axle 24. In particular, the connecting holes 42a and 44a has a plurality of splines or serrations so that the crank arms 42 and 44 are non-rotatably coupled to the crank axle 24 at a certain rotational phase so that the crank arms 42 and 44 extend in opposite directions.

A slit 42b is formed on the connecting hole 42a of the left crank arm 42 that is mounted on the crank axle 24. The left crank arm 42 is strongly fixed on the crank axle 24 by tightening up two mounting bolts B that are located on the bottom of the crank axle 24 as seen in FIG. 3. Thus, the width of the slit 42b is narrowed by tightening the mounting bolts B that extend across the slit 42b to strongly fix the left crank arm 42 on the crank axle 24. These two mounting bolts B are, for example, hexagon socket head bolts, and their heads are preferably inserted from different directions.

Figure 5:
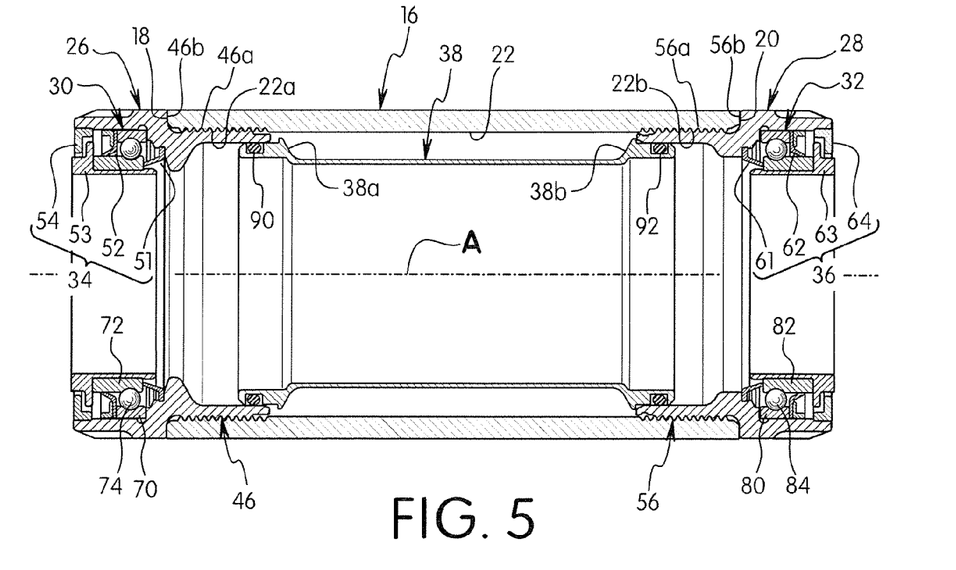
FIG. 5 is a longitudinal cross sectional view of the bicycle bottom bracket assembly illustrated in FIGS. 1 to 4 with the crank axle removed.
Figure 6:
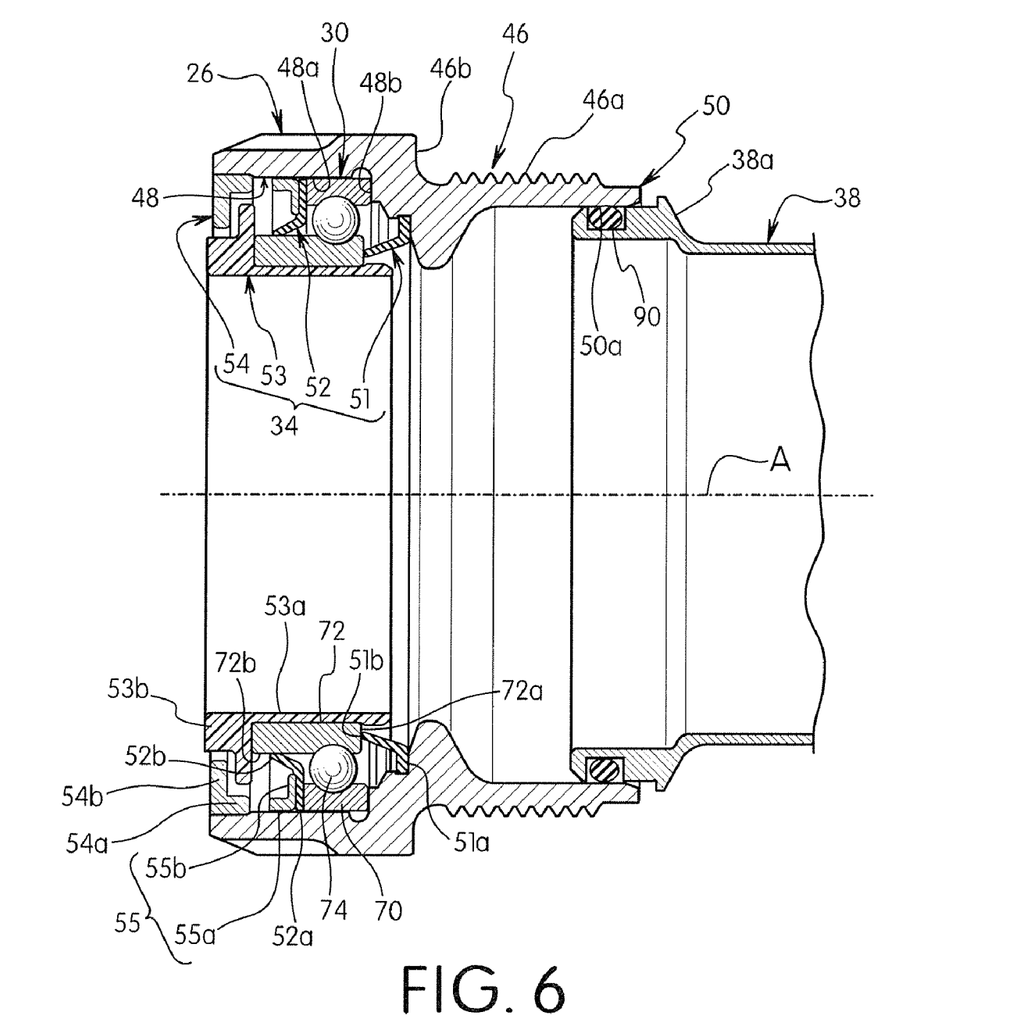
FIG. 6 is an enlarged cross sectional view of the left end portion of the bicycle bottom bracket assembly illustrated in FIGS. 1 to 5.

Turning now to FIGS. 4 to 6, the first support member 26 will now be discussed in more detail. In the first illustrated embodiment, the first support member 26 is constructed of a metallic material as a one-piece, unitary member. In the first illustrated embodiment, as seen in FIG. 6, the first support member 26 includes a first hanger mounting structure 46, a first bearing mounting structure 48 and a first connecting tube mounting part 50. The first support member 26 is sometimes called an adapter member.

As seen in FIGS. 4 and 5, the first hanger mounting structure 46 has a threaded outer circumferential surface 46a (i.e., an external thread) that is configured and arranged to be threaded into the first threaded portion 22a of the tubular hanger part 16. The first hanger mounting structure 46 also has an annular abutment 46b. The annular abutment 46b projects outward from the first outer circumferential surface 46a in a radial direction. As seen in FIG. 4, the annular abutment 46b abuts against the first open end 18 of the hanger part 16 of the bicycle frame 14.

As seen in FIG. 6, the first bearing unit 30 is press-fitted into the first bearing mounting structure 48 of the first support member 26. The first bearing mounting structure 48 has a recess that is defined by an inner circumferential surface 48a and an axially facing surface 48b. The circumferential surface 48a is dimensioned to be equal to or slightly smaller than the outer diameter of the first bearing unit 30 so that the first bearing unit 30 is retained in the recess of the first bearing mounting structure 48 by a press-fit.

The first connecting tube mounting part 50 extends axially inward from the first hanger mounting structure 46 of the first support member 26. The first connecting tube mounting part 50 is dimensioned to receive a first end 38a of the connecting tube member 38 as seen in FIG. 6. The first connecting tube mounting part 50 has an inner peripheral surface 50a. The inner peripheral surface 50a is sized to receive the first end 38a of the connecting tube member 38.

As seen in FIG. 6, the first sealing structure 34 includes a first axially inner seal member 51 and/or a first axially outer seal member 52, and, preferably, further includes a first seal guard 53 and a first auxiliary cover 54. The first sealing structure 34 is operatively disposed between the first support member 26 and the first bearing unit 30 to create a seal for preventing the ingress of water and/or other contaminates from reaching the first bearing unit 30. With the illustrated configuration, the first sealing structure 34 provides a reliable sealing structure and constitutes a lower rotational torque seal structure that prevents water from reaching the first bearing unit 30.

The first axially inner seal member 51 is an elastomeric, ring shaped member that preferably has a uniform cross sectional profile. The first axially inner seal member 51 has a proximal end 51a and a distal end 51b. The proximal end 51a is fixed to the first support member 26 at a location axially inward from the first bearing unit 30 with respect to the rotational center axis A of the first bearing unit 30. The proximal end 51a can be press-fitted into the first support member 26 with or without an adhesive disposed in-between. In any event, a watertight seal is created at the interface between the surfaces of the proximal end 51a and the first support member 26.

The first axially outer seal member 52 is an elastomeric, ring shaped member that preferably has a uniform cross sectional profile. The first axially outer seal member 52 has a proximal end 52a and a distal end 52b. The proximal end 52a is fixed to the first support member 26 at a location axially outward from the first bearing unit 30 with respect to the rotational center axis A of the first bearing unit 30. The proximal end 52a of the first axially outer seal member 52 can be press-fitted into the first support member 26 with or without an adhesive disposed in-between. In any event, As a result, a watertight seal is created at the interface between the surfaces of the proximal end 52a of the first axially outer seal member 52 and the first support member 26. The distal end 52b slidably contacts the first bearing unit 30 to create a watertight seal therebetween.

In the first illustrated embodiment, the first axially outer seal member 52 is provided with a support ring 55 at the proximal end 52a of the first axially outer seal member 52. The support ring 55 is preferably a metal ring with an L-shaped cross sectional profile having an axially extending part 55a and a radially extending part 55b. Thus, the axially extending part 55a has a generally cylindrical or tubular shape, while the radially extending part 55b has a flat ring shape. The axially extending part 55a is preferably fixed to the first support member 26. For example, as in the first illustrated embodiment, the axially extending part 55a is press-fitted into the first support member 26. The radially extending part 55b has an axially facing surface that contacts the proximal end 52a of the first axially outer seal member 52 to limit axial movement of the first axially outer seal member 52 in an outward direction from the first bearing unit 30 with respect to the rotational center axis A of the first bearing unit 30. In the first illustrated embodiment, the proximal end 52a of the first axially outer seal member 52 is sandwiched in-between the outer race 70 of the first bearing unit 30 and the radially extending part 55b of the support ring 55. Thus, the proximal end 52a is fixed to the first support member 26 at a location axially outward from the first bearing unit 30 with respect to the rotational center axis A of the first bearing unit 30.

The first seal guard 53 is a non-metallic, ring shaped member. Preferably, the first seal guard 53 is formed as a hard resinous member. The first seal guard 53 may also be made of a metallic material such as aluminum. The first seal guard 53 supports the first bearing unit 30. Thus, the first seal guard 53 is disposed between the crank axle 24 and the first bearing unit 30 such that the first seal guard 53 supports the first bearing unit 30 on the crank axle 24. As explained below, the first seal guard 53 cooperates with the first auxiliary cover 54 to aid in minimizing contamination from reaching the first bearing unit 30. In the first illustrated embodiment, the first seal guard 53 has an axially extending part 53a and a radially extending part 53b. Thus, the axially extending part 53a has a generally cylindrical or tubular shape, while the radially extending part 53b extends in a radial direction from the axially extending part 53a. The axially extending part 53a preferably retains the first bearing unit 30. For example, as in the first illustrated embodiment, the axially extending part 53a has a recess in its outer circumferential surface that snugly receives the first bearing unit 30.

The first auxiliary cover 54 is a metallic, ring shaped member. The first auxiliary cover 54 may also be made of a non-metallic material such as resin. The first auxiliary cover 54 is disposed between the first support member 26 and the first seal guard 53 such that the first auxiliary cover 54 overlaps the first seal guard 53 as viewed in a direction parallel to the rotational center axis A of the first bearing unit 30. In particular, the first auxiliary cover 54 has an L-shaped cross sectional profile with an axially extending part 54a and a radially extending part 54b. The radially extending part 53b of the first seal guard 53 and the radially extending part 54b of the first auxiliary cover 54 are arranged to form a labyrinth structure. This labyrinth structure formed by the radially extending parts 53b and 54b is positioned at a location axially outward from the first axially outer seal member 52 with respect to the rotational center axis A of the first bearing unit 30.

Figure 7:
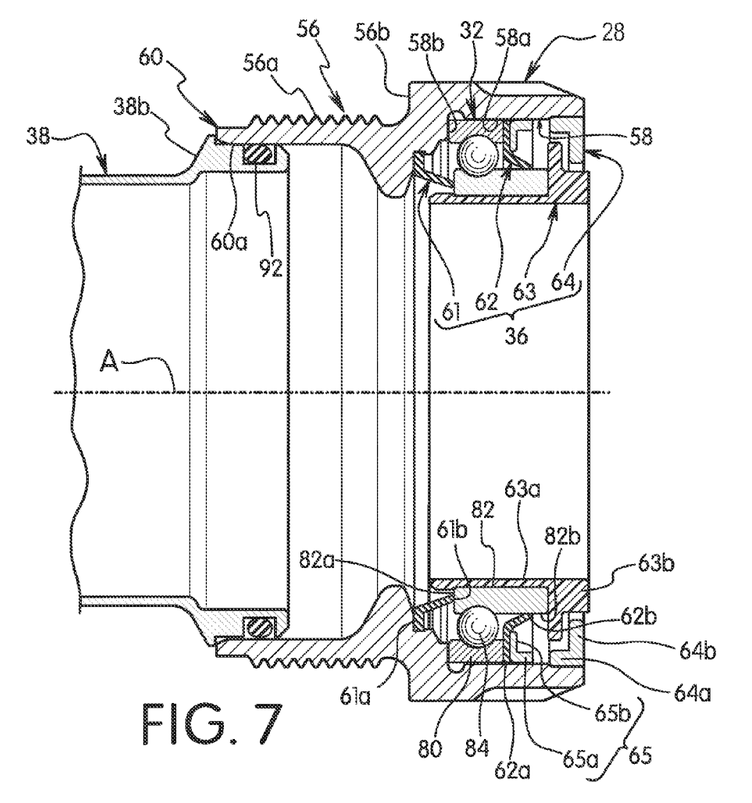
FIG. 7 is an enlarged cross sectional view of the right end portion of the bicycle bottom bracket assembly illustrated in FIGS. 1 to 5.

Turning now to FIGS. 4, 5 and 7, the second support member 28 will now be discussed in more detail. In the first illustrated embodiment, the second support member 28 is constructed of a metallic material as a one-piece, unitary member. In the first illustrated embodiment, as seen in FIG. 7, the second support member 28 includes a second hanger mounting structure 56, a second bearing mounting structure 58 and a second connecting tube mounting part 60. The second support member 28 is sometimes called an adapter member.

As seen in FIGS. 4 and 5, the second hanger mounting structure 56 is has a threaded outer circumferential surface 56a (i.e., an external thread) that is configured and arranged to be threaded into the second threaded portion 22b of the tubular hanger part 16. The second hanger mounting structure 56 also has an annular abutment 56b. The annular abutment 56b projects outward from the second outer circumferential surface 56a in a radial direction. As seen in FIG. 4, the annular abutment 56b abuts against the second open end 20 of the hanger part 16 of the bicycle frame 14.

As seen in FIG. 7, the second bearing unit 32 is press-fitted into the second bearing mounting structure 58 of the second support member 28. The second bearing mounting structure 58 has a recess that is defined by a circumferential surface 58a and an axially facing surface 58b. The circumferential surface 58a is dimensioned to be equal to or slightly smaller than the outer diameter of the second bearing unit 32 so that the second bearing unit 32 is retained in the recess of the second bearing mounting structure 58 by a press-fit.

The second connecting tube mounting part 60 extends axially inward from the second hanger mounting structure 56 of the second support member 28. The second connecting tube mounting part 60 is dimensioned to receive a second end 38b of the connecting tube member 38 as seen in FIG. 7. The second connecting tube mounting part 60 has an inner peripheral surface 60a. The inner peripheral surface 60a is sized to receive the second end 38b of the connecting tube member 38.

As seen in FIG. 7, the second sealing structure 36 includes a second axially inner seal member 61 and/or a second axially outer seal member 62, and, preferably, further includes a second seal guard 63 and a second auxiliary cover 64. The second sealing structure 36 is operatively disposed between the second support member 28 and the second bearing unit 32 to create a seal for preventing the ingress of water and/or other contaminates from reaching the second bearing unit 32. With the illustrated configuration, the second sealing structure 36 provides a reliable sealing structure and constitutes a lower rotational torque seal structure that prevents water from reaching the second bearing unit 32.

The second axially inner seal member 61 is an elastomeric, ring shaped member that preferably has a uniform cross sectional profile. The second axially inner seal member 61 has a proximal end 61a and a distal end 61b. The proximal end 61a is fixed to the second support member 28 at a location axially inward from the second bearing unit 32 with respect to the rotational center axis A of the second bearing unit 32. The proximal end 61a can be press-fitted into the second support member 28 with or without an adhesive disposed in-between. In any event, a watertight seal is created at the interface between the surfaces of the proximal end 61a and the second support member 28.

The second axially outer seal member 62 is an elastomeric, ring shaped member that preferably has a uniform cross sectional profile. The second axially outer seal member 62 has a proximal end 62a and a distal end 62b. The proximal end 62a of the second axially outer seal member 62 is fixed to the second support member 28 at a location axially outward from the second bearing unit 32 with respect to the rotational center axis A of the second bearing unit 32. The proximal end 62a of the second axially outer seal member 62 can be press-fitted into the second support member 28 with or without an adhesive disposed in-between. In any event, a watertight seal is created at the interface between the surfaces of the proximal end 62a of the second axially outer seal member 62 and the second support member 28. The distal end 62b slidably contacts the second bearing unit 32 to create a watertight seal therebetween.

In the first illustrated embodiment, the second axially outer seal member 62 is provided with a support ring 65 at the proximal end 62a of the second axially outer seal member 62. The support ring 65 is preferably a metal ring with an L-shaped cross sectional profile having an axially extending part 65a and a radially extending part 65b. Thus, the axially extending part 65a has a generally cylindrical or tubular shape, while the radially extending part 65b has a flat ring shape. The axially extending part 65a is preferably fixed to the second support member 28. For example, as in the first illustrated embodiment, the axially extending part 65a is press-fitted into the second support member 28. The radially extending part 65b has an axially facing surface that contacts the proximal end 62a of the second axially outer seal member 62 to limit axial movement of the second axially outer seal member 62 in an outward direction from the second bearing unit 32 with respect to the rotational center axis A of the second bearing unit 32. In the first illustrated embodiment, the proximal end 62a of the second axially outer seal member 62 is sandwiched in-between the outer race 80 of the second bearing unit 32 and the radially extending part 65b of the support ring 65. Thus, the proximal end 62a is fixed to the second support member 28 at a location axially outward from the second bearing unit 32 with respect to the rotational center axis A of the second bearing unit 32.

The second seal guard 63 is a non-metallic, ring shaped member. Preferably, the second seal guard 63 is formed as a hard resinous member. The second seal guard 63 may also be made of a metallic material such as aluminum. The second seal guard 63 supports the second bearing unit 32. Thus, the second seal guard 63 is disposed between the crank axle 24 and the second bearing unit 32 such that the second seal guard 63 supports the second bearing unit 32 on the crank axle 24. As explained below, the second seal guard 63 cooperates with the second auxiliary cover 64 to aid in minimizing contamination from reaching the second bearing unit 32. In the first illustrated embodiment, the second seal guard 63 has an axially extending part 63a and a radially extending part 63b. Thus, the axially extending part 63a has a generally cylindrical or tubular shape, while the radially extending part 63b extends in a radial direction from the axially extending part 63a. The axially extending part 63a preferably retains the second bearing unit 32. For example, as in the first illustrated embodiment, the axially extending part 63a has a recess in its outer circumferential surface that snugly receives the second bearing unit 32.

The second auxiliary cover 64 is a metallic, ring shaped member. The second auxiliary cover 64 may also be made of a non-metallic material such as resin. The second auxiliary cover 64 is disposed between the second support member 28 and the second seal guard 63 such that the second auxiliary cover 64 overlaps the second seal guard 63 as viewed in a direction parallel to the rotational center axis A of the second bearing unit 32. In particular, the second auxiliary cover 64 has an L-shaped cross sectional profile with an axially extending part 64a and a radially extending part 64b. The radially extending part 63b of the second seal guard 63 and the radially extending part 64b of the second auxiliary cover 64 are arranged to form a labyrinth structure. This labyrinth structure formed by the radially extending parts 63b and 64b is positioned at a location axially outward from the second axially outer seal member 62 with respect to the rotational center axis A of the second bearing unit 32.

Referring back to FIG. 6, the first bearing unit 30 is an industrial type bearing unit that is press-fitted into the first support member 26 as mentioned above. The first bearing unit 30 is coupled to the first bearing mounting structure 48. The first bearing unit 30 includes an outer race 70, an inner race 72 and a plurality of roller elements or balls 74. The roller elements or balls 74 are disposed between the outer and inner races 70 and 72. The outer race 70 is fixed to first bearing mounting structure 48 of the first support member 26.

As mentioned above, the first axially inner seal member 51 is positioned at a location axially inward from the first bearing unit 30 with respect to the rotational center axis A of the first bearing unit 30. Thus, the first axially inner seal member 51 prevents the ingress of water and/or other contaminates from reaching an inner axially facing side of the first bearing unit 30. Specifically, the proximal end 51a of the first axially inner seal member 51 is press-fitted and/or adhesively secured to the first support member 26, while the distal end 51b slidably contacts the inner race 72 of the first bearing unit 30. More specifically, the distal end 51b is in sliding contact with an axially facing surface 72a of the inner race 72 of the first bearing unit 30. Preferably, the distal end 51b is elastically deformed against the surface 72a by a small amount to create a watertight seal at the interface between the distal end 51b and the surface 72a of the inner race 72 of the first bearing unit 30. Because the proximal end 51a of the first axially inner seal member 51 is fixed to the first support member 26, not to the outer race 70 of the first bearing unit 30, it is possible to design the outer race 70 of the first bearing unit 30 to be more compact.

As mentioned above, the first axially outer seal member 52 is positioned at a location axially outward from the first bearing unit 30 with respect to the rotational center axis A of the first bearing unit 30. Thus, the first axially outer seal member 52 prevents the ingress of water and/or other contaminates from reaching an outer axially facing side of the first bearing unit 30. Specifically, the proximal end 52a of the first axially outer seal member 52 is secured to the first support member 26 by the support ring 55, while the distal end 52b is in sliding contact with an axially extended portion 72b of the inner race 72 of the first bearing unit 30. Because the proximal end 52a of the first axially outer seal member 52 is fixed to the first support member 26, not to the outer race 70 of the first bearing unit 30, it is possible to design the outer race 70 of the first bearing unit 30 to be more compact. More specifically, the distal end 52b of the first axially outer seal member 52 contacts the axially extended portion 72b of the inner race 72 of the first bearing unit 30. The axially extended portion 72b of the inner race 72 of the first bearing unit 30 includes an axially-circumferentially extending surface that constitutes a first polished surface. The distal end 52b of the first axially outer seal member 52 contacts the first polished surface of the axially extended portion 72b of the inner race 72 of the first bearing unit 30. The term "polished surface" as used herein refers to a surface that has been treated to be smoother than its original roughness. Preferably, the distal end 52b is elastically deformed against the surface 72b by a small amount to create a watertight seal at the interface between the distal end 52b and the first polished surface of the axially extended portion 72b of the inner race 72 of the first bearing unit 30. Because the distal end 52b of the first axially outer seal member 52 contacts the first polished surface of the extended portion 72b of the inner race 72 of the first bearing unit 30, the rotational torque of the first bearing unit 30 can be reduced.

Referring back to FIG. 7, the second bearing unit 32 is an industrial type bearing unit that is press-fitted into the second support member 28 as mentioned above. The second bearing unit 32 is coupled to the second bearing mounting structure 58. The second bearing unit 32 includes an outer race 80, an inner race 82 and a plurality of roller elements or balls 84. The roller elements or balls 84 are disposed between the outer and inner races 80 and 82. The outer race 80 of the second bearing unit 32 is fixed to the bearing mounting structure 58 of the second support member 28.

As mentioned above, the second axially inner seal member 61 is positioned at a location axially inward from the second bearing unit 32 with respect to the rotational center axis A of the second bearing unit 32. Thus, the second axially inner seal member 61 prevents the ingress of water and/or other contaminates from reaching an inner axially facing side of the second bearing unit 32. Specifically, the proximal end 61a of the second axially inner seal member 61 is press-fitted and/or adhesively secured to the second support member 28, while the distal end 61b slidably contacts the inner race 82 of the second bearing unit 32. More specifically, the distal end 61b is in sliding contact with an axially facing surface 82a of the inner race 82 of the second bearing unit 32. Preferably, the distal end 61b is elastically deformed against the surface 82a by a small amount to create a watertight seal at the interface between the distal end 61b and the surface 82a of the inner race 82 of the second bearing unit 32. Because the proximal end 61a of the second axially inner seal member 61 is fixed to the second support member 28, not to the outer race 80 of the second bearing unit 32, it is possible to design the outer race 80 of the second bearing unit 32 to be more compact.

As mentioned above, the second axially outer seal member 62 is positioned at a location axially outward from the second bearing unit 32 with respect to the rotational center axis A of the second bearing unit 32. Thus, the second axially outer seal member 62 prevents the ingress of water and/or other contaminates from reaching an outer axially facing side of the second bearing unit 32. Specifically, the proximal end 62a of the second axially outer seal member 62 is secured to the second support member 28 by the support ring 65, while the distal end 62b is in sliding contact with an axially extended portion 82b of the inner race 82 of the second bearing unit 32. Because the proximal end 62a of the second axially outer seal member 62 is fixed to the second support member 28, not to the outer race 80 of the second bearing unit 32, it is possible to design the outer race 80 of the second bearing unit 32 to be more compact. More specifically, the distal end 62b of the second axially outer seal member 62 contacts the axially extended portion 82b of the inner race 82 of the second bearing unit 32. The axially extended portion 82b of the inner race 82 of the second bearing unit 32 includes an axially-circumferentially extending surface that constitutes a second polished surface. The distal end 62b of the second axially outer seal member 62 contacts the second polished surface of the axially extended portion 82b of the inner race 82 of the second bearing unit 32. Preferably, the distal end 62b is elastically deformed against the surface 82b by a small amount to create a watertight seal at the interface between the distal end 62b and the second polished surface of the axially extended portion 82b of the inner race 82 of the second bearing unit 32. Because the distal end 62b of the second axially outer seal member 62 contacts the second polished surface of the extended portion 82b of the inner race 82 of the second bearing unit 32, the rotational torque of the second bearing unit 32 can be reduced.

As seen in FIGS. 3 to 5, the connecting tube member 38 is a tubular member that has an inside diameter that is dimensioned so that the crank axle 24 can pass therethrough. The connecting tube member 38 extends between the first connecting tube mounting part 50 of the first support member 26 and the second connecting tube mounting part 60 of the second support member 28. In particular, the connecting tube member 38 is fitted inside an inner circumferential surface of the first and second connecting tube mounting parts 50 and 60 so that the connecting tube member 38 concentrically extends between the first and second support members 26 and 28. A first O-ring member 90 is disposed between the first end 38a of the connecting tube member 38 and the first connecting tube mounting part 50 of the first support member 28. A second O-ring member 92 is disposed between the second end 38b of the connecting tube member 38 and the second connecting tube mounting part 60 of the second support member 26. The O-rings 90 and 92 contact the surfaces 50a and 60a to create seals therebetween, respectively, to prevent the ingress of contaminants from reaching the first and second bearing units 30 and 32.

Figure 8:
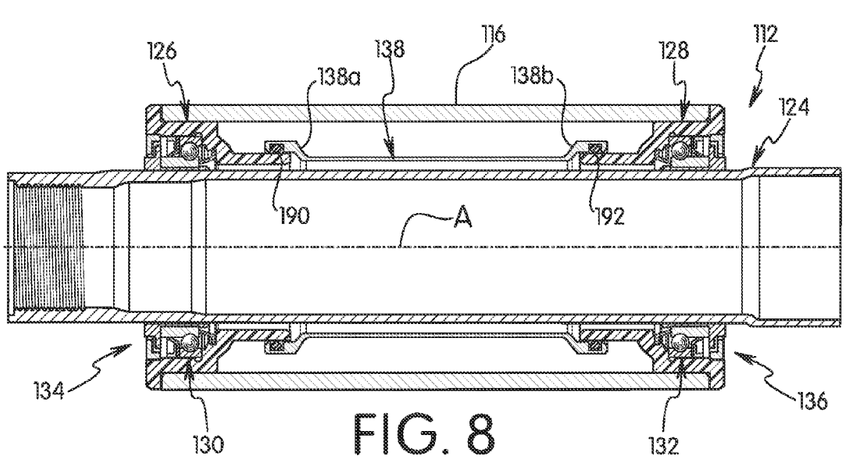
FIG. 8 is a longitudinal cross sectional view of a bicycle bottom bracket assembly accordance with another illustrated embodiment.

Referring now to FIG. 8, a bicycle bottom bracket assembly 112 is illustrated in accordance with another illustrated embodiment. The bicycle bottom bracket assembly 112 rotatably supports a crank axle 124 within a tubular hanger part 116. In particular, the bicycle bottom bracket assembly 112 includes a first support member 126, a second support member 128, a first bearing unit 130, a second bearing unit 132 for rotatably supporting the crank axle 124 within the tubular hanger part 116, and further includes a first sealing structure 134, a second sealing structure 136 and a connecting tube member 138. The crank axle 124, the first bearing unit 130, the second bearing unit 132, the first sealing structure 134 and the second sealing structure 136 are identical to the crank axle 24, the first bearing unit 30, the second bearing unit 32, the first sealing structure 34 and the second sealing structure 36, respectively, that are discussed above.

Here, in the bicycle bottom bracket assembly 112, the first and second support members 126 and 128 are resinous members that are installed in a tubular hanger part 116 of a bicycle frame via press-fit connections. Also in the bicycle bottom bracket assembly 112, the connecting tube member 138 is connected to the first and second support members 126 and 128 such that first and second ends 138a and 138b of the connecting tube member 138 is fitted over outer circumferential surfaces of first and second connecting tube mounting parts of the first and second support members 126 and 128, respectively. Thus, O-rings 190 and 192 contact the outer circumferential surfaces of first and second connecting tube mounting parts of the first and second support members 126 and 128, respectively, in this illustrated embodiment.

In view of the similarity between bicycle bottom bracket assembly 112 and the bicycle bottom bracket assembly 12, previously discussed, the bicycle bottom bracket assembly 112 will not be discussed in further detail herein. Rather, the descriptions of the parts of the bicycle bottom bracket assembly 12 apply to the parts of the bicycle bottom bracket assembly 112, except for the minor differences that are mentioned above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired unless otherwise specified. Components that are shown directly connected or contacting each other can have intermediate structures disposed between them unless otherwise specified. The functions of one element can be performed by two, and vice versa unless otherwise specified. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle bottom bracket assembly comprising:
   a support member including a hanger mounting structure and a bearing mounting structure;
   a bearing unit including an outer race, an inner race and at least one roller element disposed between the outer and inner races, the outer race being fixed to the bearing mounting structure of the support member; and
   a seal member having a proximal end fixed to the support member and a distal end slidably contacting the inner race of the bearing unit, the proximal end of the seal member being fixed to the support member at a location axially inward from the bearing unit with respect to a rotational center axis of the bearing unit.

2. The bicycle bottom bracket assembly according to claim 1, wherein
   the distal end of the seal member is in sliding contact with an axially inner facing surface of the inner race of the bearing unit.

3. A bicycle bottom bracket assembly comprising:
   a first support member including a hanger mounting structure and a bearing mounting structure;
   a first bearing unit including an outer race, an inner race and at least one roller element disposed between the outer and inner races, the outer race being fixed to the bearing mounting structure of the first support member; and
   a first axially inner seal member having a proximal end fixed to the first support member at a location axially inward from the first bearing unit with respect to a rotational center axis of the first bearing unit and a distal end slidably contacting the inner race of the first bearing unit; and
   a first axially outer seal member having a proximal end fixed to the first support member at a location axially outward from the first bearing unit with respect to the rotational center axis of the first bearing unit and a distal end slidably contacting the inner race of the first bearing unit.

4. The bicycle bottom bracket assembly according to claim 3, wherein
   the distal end of the first axially inner seal member is in sliding contact with an axially facing surface of the inner race of the first bearing unit.

5. The bicycle bottom bracket assembly according to claim 3, wherein
   the distal end of the first axially outer seal member contacts an axially extended portion of the inner race of the first bearing unit.

6. The bicycle bottom bracket assembly according to claim 5, wherein
   the axially extended portion of the inner race of the bearing unit includes a polished surface, and the distal end of the first axially outer seal member contacts the polished surface.

7. The bicycle bottom bracket assembly according to claim 3, further comprising
   a first seal guard supporting the inner race of the first bearing unit; and
   a first auxiliary cover disposed between the first support member and the first seal guard,
   the first seal guard and the first auxiliary cover being arranged to form a labyrinth structure that is positioned at a location axially outward from the first axially outer seal member with respect to the rotational center axis of the first bearing unit.

8. The bicycle bottom bracket assembly according to claim 3, wherein
the first bearing unit is press-fitted into the bearing mounting structure of the first support member.

9. The bicycle bottom bracket assembly according to claim 3, wherein
the hanger mounting structure of the first support member has a threaded outer circumferential surface that is configured and arranged to be threaded into a first open end of a hanger part of a bicycle frame.

10. The bicycle bottom bracket assembly according to claim 3, wherein
the first support member has a first connecting tube mounting part that extends axially inward from the hanger mounting structure of the first support member.

11. The bicycle bottom bracket assembly according to claim 10, further comprising
a connecting tube member that is fitted to the first correcting mounting part of the first support member.

12. The bicycle bottom bracket assembly according to claim 11, further comprising
an O-ring member disposed between one end of the connecting tube member and the first connecting tube mounting part of the first support member.

13. The bicycle bottom bracket assembly according to claim 11, wherein
the connecting tube member is fitted inside an inner circumferential surface of the first connecting tube mounting part of the first support member.

14. The bicycle bottom bracket assembly according to claim 11, wherein
the connecting tube member is fitted over an outer circumferential surface of the first connecting tube mounting part of the first support member.

15. The bicycle bottom bracket assembly according to claim 3, further comprising
a second support member including a hanger mounting structure and a bearing mounting structure;
a second bearing unit including an outer race, an inner race and at least one roller element disposed between the outer and inner races of the second bearing unit, the outer race of the second bearing unit being fixed to the bearing mounting structure of the second support member; and
a second axially inner seal member having a proximal end fixed to the second support member at a location axially inward from the second bearing unit with respect to a rotational center axis of the second bearing unit and a distal end slidably contacting the inner race of the second bearing unit.

16. The bicycle bottom bracket assembly according to claim 15, wherein
the distal end of the first axially inner seal member is in sliding contact with air axially facing surface of the inner race of the first bearing unit, and
the distal end of the second axially inner seal member is in sliding contact with an axially facing surface of the inner race of the second bearing unit.

17. The bicycle bottom bracket assembly according to claim 15, further comprising
a first axially outer seal member having a proximal end fixed to the first support member at a location axially outward from the first bearing unit with respect to the rotational center axis of the first bearing unit and a distal end slidably contacting the inner race of the first bearing unit, and
a second axially outer seal member having a proximal end fixed to the second support member at a location axially outward from the second bearing unit with respect to the rotational center axis of the second bearing unit and a distal end slidably contacting the inner race of the second bearing unit.

18. The bicycle bottom bracket assembly according to claim 17, wherein
the distal end of the first axially outer seal member contacts an axially extended portion of the inner race of the first bearing unit, and
the distal end of the second axially outer seal member contacts an axially extended portion of the inner race of the second bearing unit.

19. The bicycle bottom bracket assembly according to claim 18, wherein
the axially extended portion of the inner race of the first bearing unit includes a first polished surface, and the distal end of the first axially outer seal member contacts the first polished surface,
the axially extended portion of the inner race of the second bearing unit includes second polished surface, and the distal end of the second axially outer seal member contacts the second polished surface.

20. The bicycle bottom bracket assembly according to claim 17, further comprising
a first seal guard supporting the inner race of the first bearing unit;
a first auxiliary cover disposed between the first support member and the first seal guard, the first seal guard and the first auxiliary cover being arranged to form a first labyrinth structure that is positioned at a location axially outward from the first axially outer seal member with respect to the rotational center axis of the first bearing unit;
a second seal guard supporting the inner race of the second bearing unit; and
a second auxiliary cover disposed between the second support member and the second seal guard, the second seal guard and the second auxiliary cover being arranged to form a second labyrinth structure that is positioned at a location axially outward from the second axially outer seal member with respect to the rotational center axis of the second bearing unit.

21. The bicycle bottom bracket assembly according to claim 15, wherein
the first support member has a first connecting tube mounting part that extends axially inward from the hanger mounting structure of the first support member, and
the second support member has a second connecting tube mounting part that extends axially inward from the hanger mounting structure of the second support member.

22. The bicycle bottom bracket assembly according to claim 21, further comprising
a connecting tube member extending between the first connecting tube mounting part of the first support member and the second connecting tube mounting part of the second support member.

23. The bicycle bottom bracket assembly according to claim 22, further comprising
a first O-ring member disposed between one end of the connecting tube member and the first connecting tube mounting part of the first support member, and
a second O-ring member disposed between the other end of the connecting tube member and the second connecting tube mounting part of the second support member.

* * * * *